United States Patent
Langhoff et al.

(10) Patent No.: US 10,935,490 B2
(45) Date of Patent: Mar. 2, 2021

(54) APPARATUS FOR OPTICAL INSPECTION OF SMALL VOLUMES OF LIQUID SAMPLE AND CUVETTES THEREFOR

(71) Applicant: BD Kiestra B.V., Drachten (NL)

(72) Inventors: Brian Reuben Langhoff, Julian, NC (US); William Alan Fox, Lake Wylie, SC (US); Kerry Lynn Smith, York, PA (US)

(73) Assignee: BD KIESTRA B.V., Drachten (NL)

( * ) Notice: Subject to any disclaimer, the term of this patent is extended or adjusted under 35 U.S.C. 154(b) by 0 days.

(21) Appl. No.: 15/513,448

(22) PCT Filed: Sep. 29, 2015

(86) PCT No.: PCT/IB2015/002072
§ 371 (c)(1),
(2) Date: Mar. 22, 2017

(87) PCT Pub. No.: WO2016/051267
PCT Pub. Date: Apr. 7, 2016

(65) Prior Publication Data
US 2017/0307525 A1   Oct. 26, 2017

Related U.S. Application Data

(60) Provisional application No. 62/056,911, filed on Sep. 29, 2014.

(51) Int. Cl.
*G01N 21/51*   (2006.01)
*G01N 21/03*   (2006.01)
(Continued)

(52) U.S. Cl.
CPC ............. *G01N 21/51* (2013.01); *G01N 21/03* (2013.01); *G01N 21/253* (2013.01);
(Continued)

(58) Field of Classification Search
None
See application file for complete search history.

(56) References Cited

U.S. PATENT DOCUMENTS 3,806,259 A * 4/1974 Boostrom ................. G01J 3/02
356/244
4,055,768 A * 10/1977 Bromberg ............ G01N 21/645
250/461.2
(Continued)

FOREIGN PATENT DOCUMENTS

CA     2014294 A1    10/1990
CN     1094591 C     11/2002
(Continued)

OTHER PUBLICATIONS

International Search Report for Application No. PCT/IB2015/002072 dated Apr. 20, 2016.
(Continued)

*Primary Examiner* — Kara E. Geisel
*Assistant Examiner* — Jarreas C Underwood
(74) *Attorney, Agent, or Firm* — Botos Churchill IP Law LLP

(57) ABSTRACT

A nephelometer that measures turbidity of low volume suspensions using measurements of light transmitted through and/or scattered by the sample. The sample suspension is placed in a tiered cuvette adapted to facilitate measuring the turbidity of low volume samples. The lower portion of the cuvette has smaller dimensions, in horizontal cross section, than the top portion. Both lower and upper portions have angled surfaces. The lower, smaller portion of the cuvette is interrogated by the nephelometer.

25 Claims, 12 Drawing Sheets

(51) Int. Cl.
*G01N 21/25* (2006.01)
*G01N 21/47* (2006.01)

(52) U.S. Cl.
CPC .......... *G01N 2021/0357* (2013.01); *G01N 2021/0385* (2013.01); *G01N 2021/4726* (2013.01); *G01N 2021/513* (2013.01)

(56) References Cited

U.S. PATENT DOCUMENTS

| | | | | |
|---|---|---|---|---|
| 4,213,764 | A * | 7/1980 | O'Connor | G01N 33/54346 435/7.36 |
| 4,363,551 | A * | 12/1982 | Achter | G01N 21/51 356/338 |
| 4,560,269 | A * | 12/1985 | Baldszun | G01N 21/0303 356/246 |
| 4,639,135 | A * | 1/1987 | Borer | G01N 21/03 356/246 |
| 4,729,661 | A * | 3/1988 | Bell | G01N 21/253 356/246 |
| 5,098,661 | A * | 3/1992 | Froehlich | B01L 3/545 356/246 |
| 5,331,177 | A * | 7/1994 | Kubisiak | A47L 15/4297 250/574 |
| 5,437,841 | A * | 8/1995 | Balmer | B01L 3/02 356/246 |
| 5,462,715 | A * | 10/1995 | Koch | G01N 35/04 422/549 |
| 7,276,208 | B2 * | 10/2007 | Sevigny | B01L 9/06 211/74 |
| 7,319,522 | B2 * | 1/2008 | Havard | G01N 21/532 356/417 |
| 7,430,043 | B1 | 9/2008 | Evans | |
| 7,787,116 | B2 * | 8/2010 | Yamamoto | G01N 21/0303 356/244 |
| 8,211,386 | B2 * | 7/2012 | Talmer | B01L 3/5082 422/560 |
| 8,576,399 | B2 * | 11/2013 | Andelic | G01N 21/49 356/441 |
| 9,341,640 | B2 * | 5/2016 | Shintani | B01L 3/5082 |
| 9,612,192 | B2 * | 4/2017 | Drechsler | G01N 21/03 |
| 2006/0087650 | A1 * | 4/2006 | Shen | B01L 9/06 356/244 |
| 2012/0156796 | A1 * | 6/2012 | Drechsler | G01N 21/03 436/164 |
| 2013/0029343 | A1 * | 1/2013 | Day | B01L 3/50851 435/6.12 |
| 2013/0287651 | A1 | 10/2013 | Talmer et al. | |
| 2014/0050619 | A1 * | 2/2014 | Meller | B01L 3/5082 422/63 |
| 2014/0146313 | A1 * | 5/2014 | Trainoff | G01N 21/03 356/246 |
| 2015/0036121 | A1 * | 2/2015 | Kurowski | G01N 21/51 356/51 |
| 2016/0103061 | A1 * | 4/2016 | Weber | B01L 3/5082 356/246 |
| 2017/0307525 | A1 | 10/2017 | Langhoff et al. | |

FOREIGN PATENT DOCUMENTS

| | | |
|---|---|---|
| CN | 2534578 Y | 2/2003 |
| CN | 101158698 A | 4/2008 |
| CN | 101228430 A | 7/2008 |
| CN | 201732058 U | 2/2011 |
| CN | 103585940 A | 2/2014 |
| CN | 204228605 U | 3/2015 |
| CN | 205246536 U | 5/2016 |
| EP | 0512368 A2 | 11/1992 |
| EP | 0661532 A2 | 7/1995 |
| EP | 1909094 A1 | 4/2008 |
| EP | 1909094 * | 9/2008 |
| EP | 2466291 * | 6/2012 |
| EP | 2466291 A1 | 6/2012 |
| EP | 2466291 B1 * | 11/2013 |
| GB | 2120784 A | 12/1983 |
| JP | 56138366 U | 10/1981 |
| JP | 59067447 A | 4/1984 |
| JP | 2012127964 A | 7/2012 |
| WO | 9609548 A1 | 3/1996 |
| WO | WO2007/126389 * | 11/2007 |
| WO | WO 2007/126389 * | 11/2007 |
| WO | 2013004674 A1 | 1/2013 |
| WO | WO2013004674 A1 | 1/2013 |

OTHER PUBLICATIONS

Communication pursuant to Article 94(3) EPC issued in corresponding EP application No. 15808453.3 dated Dec. 6, 2018.
Chinese Office Action issued in CN application No. 201580060790.5 dated Jan. 14, 2019, pp. 10.
International Preliminary Report on Patentability, issued in corresponding PCT application No. PCT/IB2015/002072 dated Apr. 4, 2017.
Chinese Office Action issued in corresponding CN application No. 2015800607905 dated Oct. 9, 2019, pp. 30.
JP Office Action issued in corresponding JP application No. 2017516710 dated Aug. 20, 2019.
Chinese Office Action issued in CN application No. 2015800607900.5 dated Apr. 28, 2020.
BR Office Action issued in corresponding BR Appl. No. BR112017006363-8 dated Jun. 1, 2020 (8 pages).

* cited by examiner

APPARATUS FOR OPTICAL INSPECTION OF SMALL VOLUMES OF LIQUID SAMPLE AND CUVETTES THEREFOR

CROSS-REFERENCE TO RELATED APPLICATION

The present application is a national phase entry under 35 U.S.C. § 371 of International Application No. PCT/IB2015/002072 filed Sep. 29, 2015, published in English, which claims the benefit of the filing date of U.S. Provisional Application No. 62/056,911, filed Sep. 29, 2014, all of which are incorporated herein by reference.

BACKGROUND OF THE INVENTION

Bacterial cultures are ordinarily grown in specialized media plates. The plates generate mass colonies and some isolated colonies. The isolated colonies ordinarily have the purest form of bacteria because the colony is usually grown from a limited number of bacteria and is isolated from other bacterial growth. Testing the smallest number of colonies is usually desired to ensure sample purity. However, current laboratory practices require collecting bacterial samples from the media and diluting the samples in tubes containing relatively large volume of fluid. Obtaining a sufficient concentration of bacterial matter in the fluid suspension requires harvesting a large number of bacterial colonies from the media plate in order to make a suspension. One drawback is that this technique may reduce sample purity.

One approach is to create a highly concentrated suspension from a low bacterial sample yield using small fluid volumes (e.g., 200-500 μL). This is especially important in machine automation when an automated colony picking system is used to harvest the samples and create the suspension. For example, an automated colony picker may be required to make several passes to the media plate in order to pick colonies when generating the suspension. Optimal results are obtained if the picker selects from a relatively low number of colonies (e.g., 5 or less) in order to create a suspension with adequate bacterial concentration. This approach requires a suspension fluid volume of 300 μL or less. One drawback is that it is difficult to determine the bacterial concentration in a small fluid volume with a highly concentrated suspension. Therefore, a need exists for a system and methods for accurately determining bacterial concentrations in a small fluid volume while automatically diluting the samples to a desired concentration.

Bacterial concentration can be determined by measuring the turbidity or "cloudiness" of a culture and then translate this measurement into cell numbers (CFUs). The standard microbiological method of estimating turbidity of a sample is based on obtaining a quantitative value known as a McFarland value. McFarland values are well known to those skilled in the art and are not described in detail herein. McFarland standards are solutions of a known turbidity that are used to standardize culture density in microbiological, clinical and other similar laboratories.

Turbidity of microbial suspensions is usually determined by an instrument such as a nephelometer or a densitometer. The instruments base their measurements on physical principles of light scattering which result from the interaction of light with particle(s) in a suspension. Turbidity of the samples effects the transmission and scattering of the light, and allows for a measure of intensity of light transmitted through a sample. A nephelometer is an automatic instrument used to measure turbidity of a sample by passing light through the sample at an angle and measures the intensity of scattered light. Such measurement is based on the principle that a dilute suspension of small particles will scatter light that is passed through (not absorbed) by the particles. The amount of scatter is determined by collecting the light at a 30 or 90 degree angle.

Nephelometers currently used in the laboratories are designed to receive the samples inside a round tube/vessel. This practice yields acceptable results so long as the tubes or vessels are cleaned prior to use and placed inside the apparatus in the same orientation for each respective sample. For nephelometry, round tubes have several drawbacks. One is that the tubes are not disposable, and must be cleaned prior to reuse, risking cross-contamination. Another drawback is that light paths are more variable through round tubes making it difficult to obtain light path consistency from sample to sample and tube to tube.

In nearly all instances, a vessel having a unique configuration is required for each sample placed inside the nephelometer for measuring turbidity. Use of vessels having various sizes and shapes may provide inconsistent turbidity readings for each sample. Apparatuses and methods are needed that are designed to minimize variability of measurements among the vessels as well as minimize the effect of diffraction and refraction on the light as it passes through and between different mediums.

In addition, most nephelometers, such as the PhoenixSpec™ (Becton Dickinson), require a cell length of at least one (1) centimeter (cm) in their associated tubes, and are therefore not for use with a very small volume of microbial suspensions, such as, for example, suspensions of about 200 or about 500 micro-liters (μL). In standard test tubes (e.g., a 15 ml test tube), a suspension of as low as about 500 μL may yield cell lengths of less than 1 cm, which would not be adequate to measure McFarland value using a commercially available nephelometer. A narrower test tube, for example, may be used to increase the height of the sample to a detectable level. However, such test tubes are often not utilized with nephelometers and/or densitometers because these instruments are designed to house test tubes of specific sizes and configurations. Therefore, an apparatus and method are needed that can allow for a rapid and accurate measure of turbidity for suspensions having a volume of less than about 500 μL, and preferably as low as about 200 μL. In addition, an apparatus and methods are needed where the sample can be purified and diluted inside the vessel to estimate turbidity, where the vessel is configured to dilute the samples and provide accurate and consistent turbidity measurements for low sample volumes.

BRIEF SUMMARY OF THE INVENTION

The apparatus and cuvette described herein cooperate to provide accurate optical interrogation of a small volume of sample. Optical interrogation, as used herein is the transmission of an optical signal into sample within an optically transparent cuvette. Examples of optical interrogation include spectrometry and nephelometry. The invention is described in terms of nephelometry but the aspects of the cuvette described herein are applicable and adaptable to other devices for optical interrogation. In one embodiment, the apparatus and methods according to the present invention provide an accurate estimate of McFarland values for a microbial suspension for volumes of sample having a volume of about 100 μL to about 500 μL and all volumes and ranges within that range by utilizing electronic detector/sensors and specialized vessels. Small volumes are defined elsewhere herein. The detectors/sensors and nephelometer cooperate to provide a uniform light path for all samples that are measured using the detectors/sensors described herein. The methods described herein utilize the principles of nephelometry, which measures the amount of scattered and/or transmitted light through a sample to provide a turbidity measurement.

In the described methods, a vessel's diameter, volume and orientation within the nephelometer relative to the light source are selected to provide an advantageous sample cell length for turbidity measurements. According to the embodiments described herein, the biological sample is mixed with a suspension fluid directly inside the vessel placed in the automated system or apparatus (i.e., the nephelometer) designed to measure sample turbidity. In certain embodiments, a continuous array of receptacles configured to receive vessels (the vessels being of various sizes, volumes and cell lengths) are continuously indexed through the apparatus. Because the apparatus is automated, it is convenient for use in various microbiological, clinical and laboratory settings.

The apparatus according to the present invention is an arrangement of electronic sensors placed adjacent a specialized cuvette/vessel that is illuminated with a selected wavelength(s) of light from an LED or a laser source. The cuvette is designed for interrogation of a small volume of sample (defined elsewhere herein)) for turbidity measurements. A microbial suspension is first prepared. The suspension is then introduced into the vessel. In one embodiment, the apparatus obtains turbidity measurements for samples in small volume vessels that concentrate the samples in the area of the vessel where the sample is interrogated. In some embodiments, the vessels have a square or rectangular configuration. As such, the walls of the vessel are at about a ninety degree angle with each other. This arrangement allows for more uniform control of wall thicknesses, which reduces the variability of McFarland readings among vessels that would arise if wall thickness variations from vessel to vessel were greater. Also, the square shape of the vessels allows the light to enter the vessel at a right angle to the surface plane of the vessel. This reduces the amount of diffraction or refraction of the interrogating light as it enters (or leaves) the vessel.

In other embodiments described herein, an automated nephelometer apparatus having a base, a receptacle configured to receive a vessel, a scatter detector, a transmitted light detector, a light attenuation filter, a light source, and a focusing lens is described. The nephelometer is adapted to receive a vessel having a low volume portion from which the nephelometry measurements are made and a larger volume dilution portion that is provided to allow the suspension to be diluted to the desired concentration. The vessel that is adapted to be received by the nephelometry apparatus described herein is referred to interchangeably as a "vessel" or a "cuvette." In one embodiment, the apparatus is configured to receive and process one vessel at a time. In another embodiment, the apparatus has a sliding channel configured to receive a continuous series of vessels placed inside a linear receptacle. The linear receptacle is configured to have wells that are designed to receive the vessels. The vessels can receive liquid samples ranging in volume from about 200 µL to about 500 µL.

In one embodiment, the sample suspension is dispensed into a single vessel and the vessel is individually interrogated by the nephelometer. After the sample suspension is processed and McFarland values are obtained, the vessel is removed from the nephelometer and a new vessel is placed in the nephelometer for assessment. In this embodiment, the nephelometer can have one cuvette receptacle or multiple cuvette receptacles. Each receptacle is configured to make nephelometry measurements as described herein. In the embodiments wherein the nephelometer receives a series of cuvettes for measurement, a series of cuvette receptacles are provided to facilitate nephelometry measurements of several suspensions in parallel.

In an alternate embodiment, the cuvettes are provided in a two-dimensional array. The narrower, lower portion of the cuvettes extends below the array support. The array is placed in the base that receives the array and inspects each cuvette individually. In one embodiment the array is place in the base by a robot.

With regard to the vessel or cuvette, in one embodiment the cuvette has a narrower lower portion, and a wider upper portion. Optionally there is a tapered portion transition from the wider upper portion to the lower portion. The lower portion is adapted to be received by the nephelometer for measurement. The upper portion and lower portion share a common axis. In the illustrated embodiment, both portions are square or rectangular, and therefore both have planar faces. In one embodiment the plane of the faces of the upper portion are parallel to the planes of the faces in the lower portion. In another embodiment, the plane of the faces of the lower portion intersect the plane of the faces of the upper portion at a 45 degree angle. However, the cuvettes contemplated herein are not required to have a rectangular or square top portion. In other embodiments, the top portion can be round or elliptical if desired. The bottom portion (through which the measurements are made) is required to be rectangular or square for the reasons describe elsewhere herein.

In one embodiment, the nephelometer has two detectors that simultaneously capture the light that is transmitted and/or scattered from the particles of the suspension through which the optical signal is transmitted. The side scatter detector is positioned to receive light at a 90 degree angle from the light beam incident on the cuvette. The transmitted light detector is positioned to receive light directly from the light source that is transmitted through the cuvette continuing through the suspension. In some embodiments, the transmitted light detector is positioned perpendicular to the incident light beam. In alternative embodiments, the transmitted light detector is positioned opposite the light source but at an angle that reduces the effects of reflectance refraction and diffraction caused by the detector surface and surrounding structure. A light attenuation filter is positioned between the vessel and the transmitted light detector in some embodiments. In the exemplary embodiments, a focusing lens is deployed. The focusing lens is positioned directly in front of a light source and is used to focus the light into a narrow light beam along the light path. In some embodiments the light beam is collimated through an aperture or a series of apertures (e.g. two apertures).

Various embodiments described herein further provide an accurate method of measuring the turbidity of a suspension where said suspension has insufficient volume to be read by most nephelometer or densitometer devices. The methods described herein obtain turbidity estimates of a liquid suspension having low volumes in the range of about 200 µL to about 500 µL. The methods and apparatus described herein can also be used to measure the turbidity of higher volume sample suspensions. The methods described herein further allow for automated dilution of the sample suspension inside the vessels designed according to the present invention. The methods include placing a suspension fluid into a vessel, adding a biological sample suspected of containing microorganisms to the suspension fluid, mixing the sample, and measuring the initial turbidity of the sample. The volume of the initial fluid suspension is preferably about 300 µL or less. That way, if dilution is required, the dilution will not cause the total volume to be much in excess of about 3.6 mL. That being said, the apparatus and methods described herein are not limited to measuring the turbidity of only small volumes. If the turbidity of the initial sample suspension is less than the predetermined target turbidity, additional suspension fluid is added using the automated system of the present invention to further dilute the sample and repeat the turbidity measurements for the diluted suspension. The methods of various embodiments enable measuring McFarland levels of samples for use with methods such as Mass Spectrometry (e.g., matrix-assisted laser desorption/ionization-time-of-flight mass spectrometer, MALDI-TOF).

BRIEF DESCRIPTION OF THE DRAWINGS

To assist those of ordinary skill in the relevant art in making and using the subject matter thereof, reference is made to the appended drawings.

DETAILED DESCRIPTION

Figure 1A:
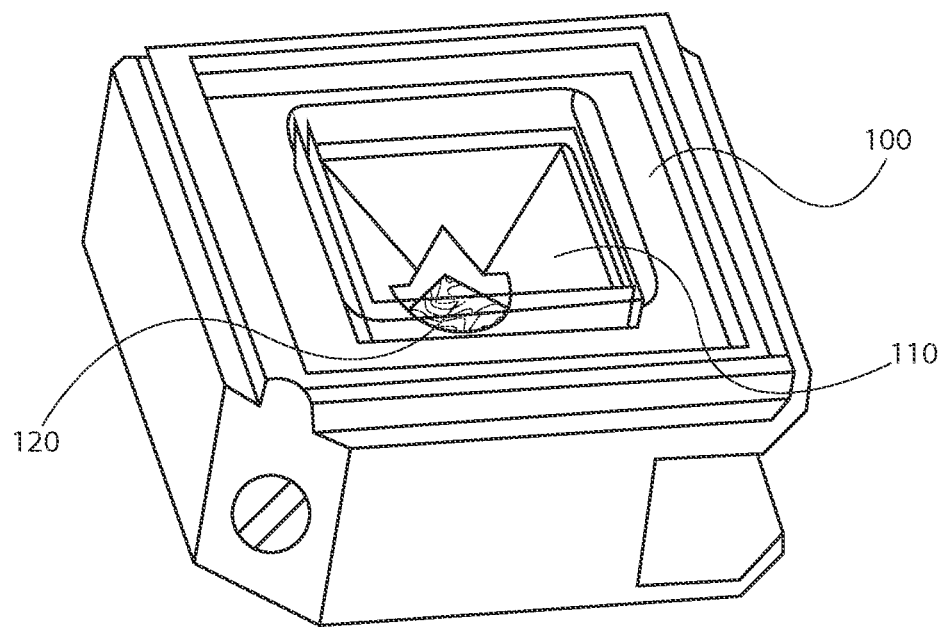
FIG. 1A illustrates one embodiment of low volume single cuvette nephelometer.

Embodiments described herein provide for automated methods of measuring turbidity of liquid suspensions using vessels that are configured to receive and measure low sample volumes yet accommodate dilution of the suspension inside the individual vessels. The disclosed methods further allow for measuring turbidity levels in suspensions having insufficient volume to be measured using conventional vessels and apparatus. The nephelometry apparatus described herein is configured for integration into a system where suspension dilution and turbidity measurements are automated.

All numerical values within the detailed description and the claims herein are modified by "about" or "approximately" the indicated value, and take into account experimental error and variations that would be expected by a person having ordinary skill in the art.

As used herein, a "low volume" and/or a "small volume" sample refers to a sample having a volume of about 100 µL to about 500 µL and all volumes and ranges within that range (i.e., about 100 µL to about 200 µL; about 100 µL to about 300 µL; about 100 µL to about 400 µL; about 200 µL to about 500 µL; about 200 µL to about 300 µL; about 200 µL to about 400 µL about 300 µL to about 500 µL, about 300 µL to about 340 µL, about 400 µL to about 500 µL etc.)

As used herein, the term "liquid suspension" and/or "liquid sample" refer to a mixture of soluble and/or insoluble particles and/or solid materials dispersed in a liquid. In some embodiments, the liquid sample is a biological sample. Examples of a biological sample are well known to one skilled in the art and are not described in detail herein. Representative examples include biological tissue, fluid obtained in vivo, fresh blood, whole banked blood, etc.

As used herein, a "cuvette" and/or "micro-cuvette" and/or "low volume cuvette" and/or "LVC" and/or "sample vessel" or "vessel" is the container suitable for receiving a liquid suspension. The container is preferably made of optically transparent plastic or glass that is designed to hold a test sample in a specific space and orientation for testing or processing.

As used herein, "algorithms" are one or more mathematical instructions that are used to manipulate values of data to make a decision based on a mathematical value and then produce a corrected or more accurate data value representative of the desired output.

As used herein, an "amplifier" is an electronic circuit that is used to take a smaller original electronic signal and increase its amplitude to produce a proportionately larger new signal that is representative of the original signal. Suitable amplifiers are well known to those skilled in the art and are not described in detail herein.

As used herein, an "analog to digital converter" or "A/D converter" is an electronic device that is capable of taking a variable electrical signal and turning it into a number that is representative of the amplitude of the original signal.

As used herein, "dilution" means a solution or suspension produced by adding a liquid diluent to a concentrated solution or suspension resulting in a new suspension or solution with a lower uniform concentration of sample in the solution or suspension than the original.

As used herein, "laser" or "laser diode" is an electronic device that produces a concentrated and focused beam of light when an electrical current is applied.

As used herein, "light attenuation filter" is a device that is placed into a light path to absorb and reduce the amount of light as it passes through the filter resulting in the light that was passed through the filter to have proportionally lower intensity than the original light source.

As used herein, "light emitting diode" or "LED" is an electronic device that emits light of a specific type and orientation when an electrical current is applied.

As used herein, "McFarland" is a unit of measure of the amount of solid particulates dispersed in a fluid or liquid suspension.

As used herein, "nephelometer" is an instrument that is capable of measuring the amount of solid particles in a suspension. As used herein, "nephelometry" refers to a method by which the amount of suspended solids in a suspension can be measured.

As used herein, "photo-diode" and/or "detector" is an electronic device used to measure the intensity of light in a given environment.

As used herein, "saturated" and/or "saturation" is the point at which the detector has reached the maximum amount of output signal it is capable of producing. For example, adding more light to the photo-detector past saturation does not produce any further change in the detector output signal which has reached its maximum operating capability.

As used herein, "suspension" is a solution in which solids are distributed uniformly in the liquid.

As used herein, "turbidity" is the measurement of the amount of suspected solids in a solution (i.e., cloudiness of a liquid sample).

In the embodiments described below, the apparatus is described in terms of device that is configured to detect light that is both transmitted through and scattered by the sample in the cuvette. Contemplated herein are devices and methods in which only of the light scattered by the sample, transmitted through the sample, or both are measure to determine turbidity. In some embodiments, an additional photodetector may be provided to the side of the light path to one of the scattered light detector, the transmitted light detector or both. In those embodiments where the light source is an LED, the measurement made by this additional photodetector is used in a control loop to adjust power to the LED and maintain a consistent and repeatable light intensity. Use of such detectors to control LED output, address thermal drift and compensate for any degradation in signal output are well known to one skilled in the art and not described in detail herein.

Figure 1B:
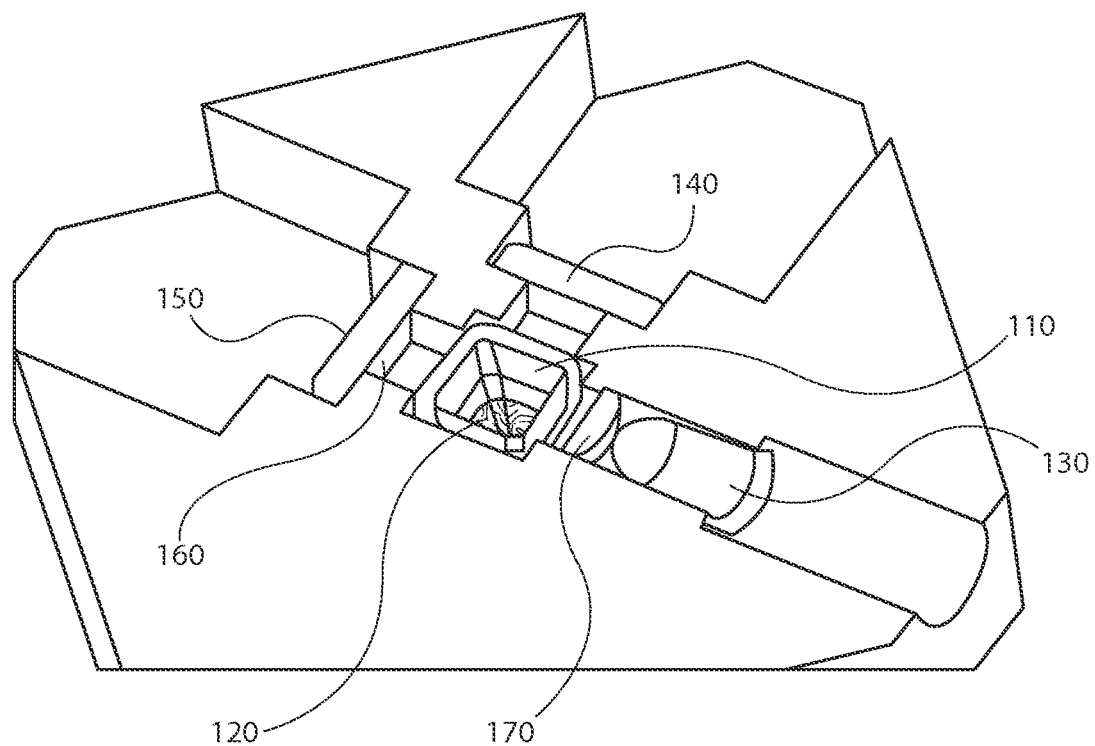
FIG. 1B is a cut away view of the single cuvette nephelometer along line 1-1 of FIG. 1A.

FIG. 1 illustrates the system of one embodiment described herein for measuring turbidity of a liquid sample using a nephelometer and principles of nephelometry. The sample system is designed to house a single cuvette 110 that has a suspension fluid 120 placed inside a nephelometer base 100 as shown in FIG. 1A. The system also includes a light source 130, a focusing lens 170, a side scatter detector 140, a transmitted light detector 150, and a light attenuation filter 160 (FIG. 1B). The cuvette 110 with a sample 120 is positioned at the center of the apparatus and inside the nephelometer base 100. The light source 130, the scatter detector 140 and the transmitted light detector 150 are positioned at 90 degree angles from one another around the cuvette 110. Positioning the scatter detector 140 within close proximity to the cuvette containing the sample suspension 120 and parallel to the incident light source minimizes the effects of diffraction, refraction and reflection on the scattered light. The transmitted light detector 150 is positioned at 180 degrees or opposite from the light source 130. The detector 150 also may be oriented either perpendicular to the incident light beam or at a different angle to reduce reflectance effects from its surfaces. The light attenuation filter 160 is positioned between the cuvette 110 and the transmitted light detector 150. The system for measuring turbidity detects scattered and/or transmitted light that is passed through the tested sample at an angle. In this configuration, sample suspensions are individually processed inside the vessel 110.

Figure 4A:
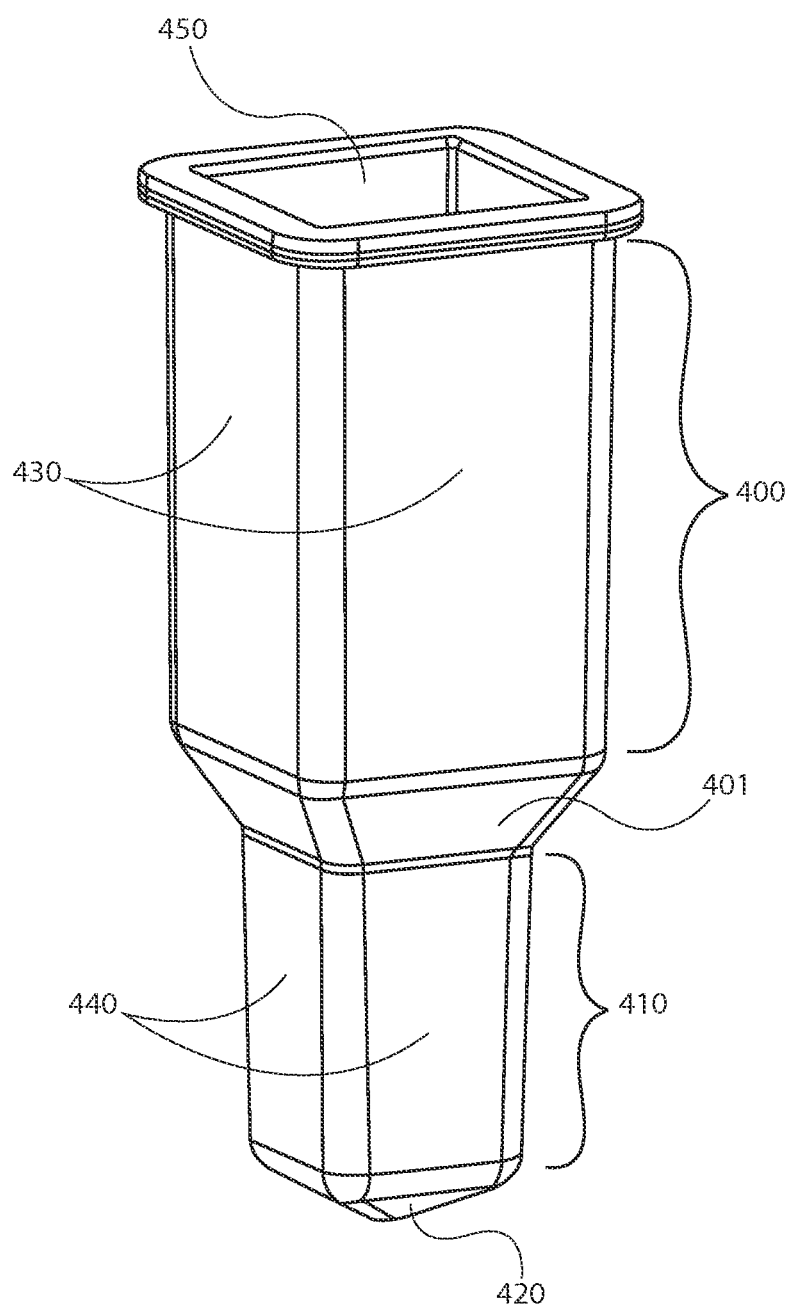
FIG. 4A illustrates a cuvette according to one embodiment of the present invention.
Figure 4B:
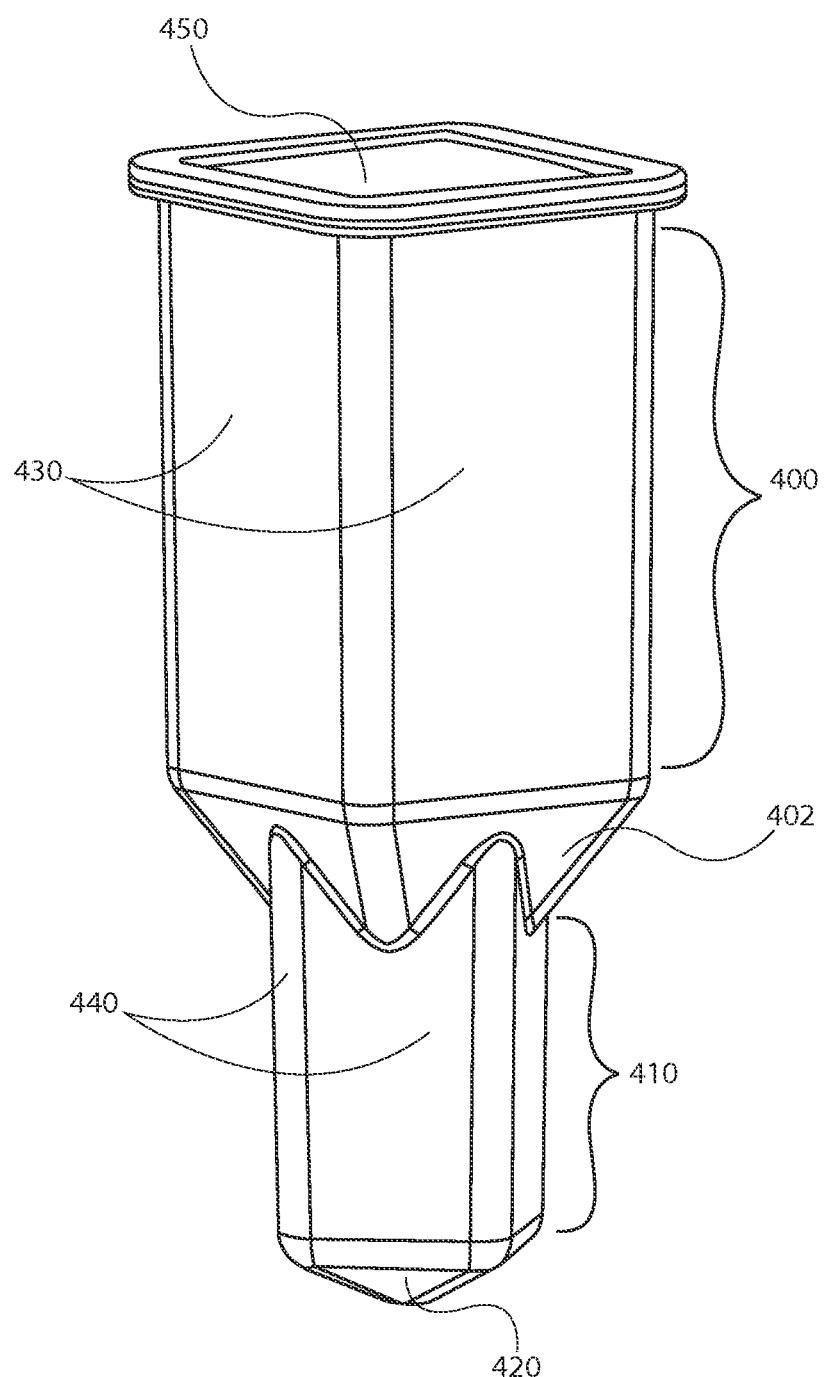
FIG. 4B illustrates a cuvette according to an alternate embodiment of the present invention.

The invention contemplates use of low volume vessels/cuvettes (or micro-cuvettes) that are designed to process relatively small quantities of biological and fluid suspensions for use with the low volume nephelometer. In the exemplary embodiments, the cuvette is molded from optically clear plastic with minimally tapered sides that have an optically smooth polish to be conveniently oriented within the nephelometer disclosed herein. The cuvettes may be configured as individual units for single use applications. In the embodiments where a series of cuvettes are used to prepare suspensions, the cuvettes can be configured for use with linear array strips for such applications. Alternatively, the cuvettes may be configured for use with a matrix array designed for processing multiple samples simultaneously. In the matrix embodiment, multiple series of suspensions are prepared in parallel. FIGS. 4A-B illustrate alternative embodiments of the low volume cuvette design for use with nephelometers described herein. The cuvette 110 has a lower portion 410 that has a small volume. The suspension is initially prepared in the small volume portion. The suspension is therefore first disposed inside the lower portion 410 of the cuvette. Next, a biological sample suspected of containing a target microorganism(s) is added to, and mixed with, the fluid suspension to provide a test sample suspension 120. The turbidity of the suspension in the lower portion 410 is measured. The light 130 is passed through the sample suspension 120 that is disposed inside the lower portion 410. The measuring apparatus is configured to measure turbidity of the sample in the lower portion 410 of the cuvette. Beneath the lower portion 410 is a "large particulate" collection area 420 which is designed to receive large particles that settle from the sample suspension that would otherwise adversely affect the accuracy of the turbidity measurements made by the nephelometer. Low volume samples otherwise have insufficient volume to allow the particulate contaminants to settle from the portion of the suspension interrogated by the nephelometer. For example, a light which passes through a low volume suspension that contains particulate impurities may not differentiate between the sample in suspension and the impurities and can yield inaccurate McFarland values that will in turn cause the sample to be processed improperly. For example, an inaccurate McFarland value may inform the wrong dilution. An inaccurate McFarland value may cause a sample to be processed downstream (either by AST or Maldi for example), when, had the true McFarland value been known, the sample would not have been further processed. That is, the true McFarland value would have informed the operator that the sample was not suited for Maldi or AST. In addition, the presence of impurities in the sample may interfere with the accurate concentration measurements of the sample being tested. The cuvettes according to the present invention provide a separate collection area 420 that is outside of the direct light path that passes through lower portion 410. Particulate contaminants settle into the collection area 420 and do not remain in the tested area of the sample suspension, which occurs in the lower portion 410. The cell length of the lower portion is in the range of about 5.5 mm and is designed to provide sufficient cell length for low volume samples to obtain adequate turbidity measurements. The lower portion is designed to provide sufficient cell length once a test sample suspension is prepared in order for the light to pass through the samples and be captured by the detectors 140 and 150. Preferably, the lower portion 410 is made of a highly polished optical material or a material having near optical clarity and other optically transmissive materials known to one skilled in the art. Such materials allow the light to pass through the walls of the lower portion of the cuvette without interference.

One skilled in the art will appreciate that there are three dimensions of design freedom to configure the small volume portion of the cuvette. The dimensions of the small volume are largely a matter of design choice. In one embodiment, the dimensions of the small volume portion are configured to receive a device (i.e. a pick tool) that will introduce the sample into the lower portion of the cuvette. For example, and not by way of limitation, the lower portion of the cuvette is dimensioned to provide adequate room for a 3 mm diameter pick tool to be submerged and rotated within the lower portion such that it does not touch the sides of the cuvette, creating scratches and surface aberrations that would degrade the optical transparency of the cuvette.

Of course, the dimensions of the lower portion must accommodate optical inspection of the sample. Specifically, the lower portion of the cuvette is dimensioned to work with the optical source and detectors of the optical inspection device. The dimensional constraints on cuvette design are therefore a function of the configuration of the device that will optically interrogate the sample.

Above the lower portion 410 is the upper portion 400 which is used to dilute the sample suspension placed inside the vessel for further processing in downstream applications. The upper portion 400 has a larger width and length than the lower portion 410. Preferably, the internal dimensions of the vessel are designed to accommodate automated mixing of the biological sample with a suspension fluid to further dilute the test sample suspension directly inside the vessel when required. In operation, the tiered vessel design allows the turbidity of the sample suspension to be measured and, if target turbidity has not been reached, to further dilute the sample and repeat the turbidity measurements. Such a configuration allows dilution of the sample in real time (i.e. as the sample is being optically interrogated). In addition, the tiered vessel design makes it possible to measure the turbidity of low volume sample suspensions (e.g. suspensions with a volume of about 200 µL to about 500 µL) yet have the benefits of a larger volume to accommodate sample dilution.

In the exemplary embodiments, the vessel is a two-tiered cuvette. The top tier has an approximately square or rectangular or round perimeter. Basically the geometric configuration of the top portion is a matter of design choice. The bottom tier also has an approximately square perimeter. The cuvette "telescopes" from top to bottom because the top tier has larger dimensions (in horizontal cross section) than the lower portion. Alternative shapes for the cuvette are also contemplated so long as the walls of the bottom portion of the cuvette are at an angle from one another (e.g., the cuvette is not cylindrical, elliptical etc.). It has been found that positioning the walls of the lower portion of the cuvette (i.e. the portion received by the nephelometer) at an angle from one another (compared to a round-shape tube) allows for less aberration to the optical signal and better mixing of the test sample. In one illustrated embodiment, the upper portion 400 has been selected to have four sides 430 that are perpendicular to one another, thereby defining a square. The lower portion 410 also has four sides 440 that are perpendicular to one another, except the dimensions of the sides 440 are narrower than the sides 430. The smaller, lower portion 410 is configured to be received by the nephelometer base and/or linear cuvette array. The top of the cuvette has an opening 450 for receiving the sample and diluent. The side walls 430 and 440 of the upper and lower portions, respectively, are configured as planar surfaces. Without being bound to any particular theory, it is believed that planar surfaces minimize diffraction and refraction of the light that passes through the surface of the cuvette. In addition, the square configuration of the cuvettes/vessels allows for the light paths to pass through and into the sample suspension and the vessel at right angles to the surface plane of the vessel. This configuration also minimizes the potential for diffraction or refraction of the light source 130 as it enters and leaves the cuvette.

Various configurations of the cuvette are contemplated. In one embodiment, the top portion of the cuvette is tapered to the lower portion. The corners of the top portion align with the corners of the lower portion as can be seen by straight edges 401 (FIG. 4A). The tapered edges 401 demark the transition between the wider upper portion 400 and the narrower lower portion 410. In another embodiment, the edges of the upper portion 400 are offset from the edges of the lower portion 410 as the offset edges 402 are illustrated in FIG. 4B. For example, the edges 402 are offset by 45 degrees from the edges of the top portion. Advantageously, this configuration allows for the light source and detectors to be arranged on either side of the cuvette when the cuvette is placed inside the nephelometer base. Placement of the cuvettes with edges 402 inside the linear array 300 allows for more efficient transport of the cuvettes through the nephelometer because they can be processed in series and received by the nephelometer and measured without additional manipulation of the cuvette.

Figure 5:
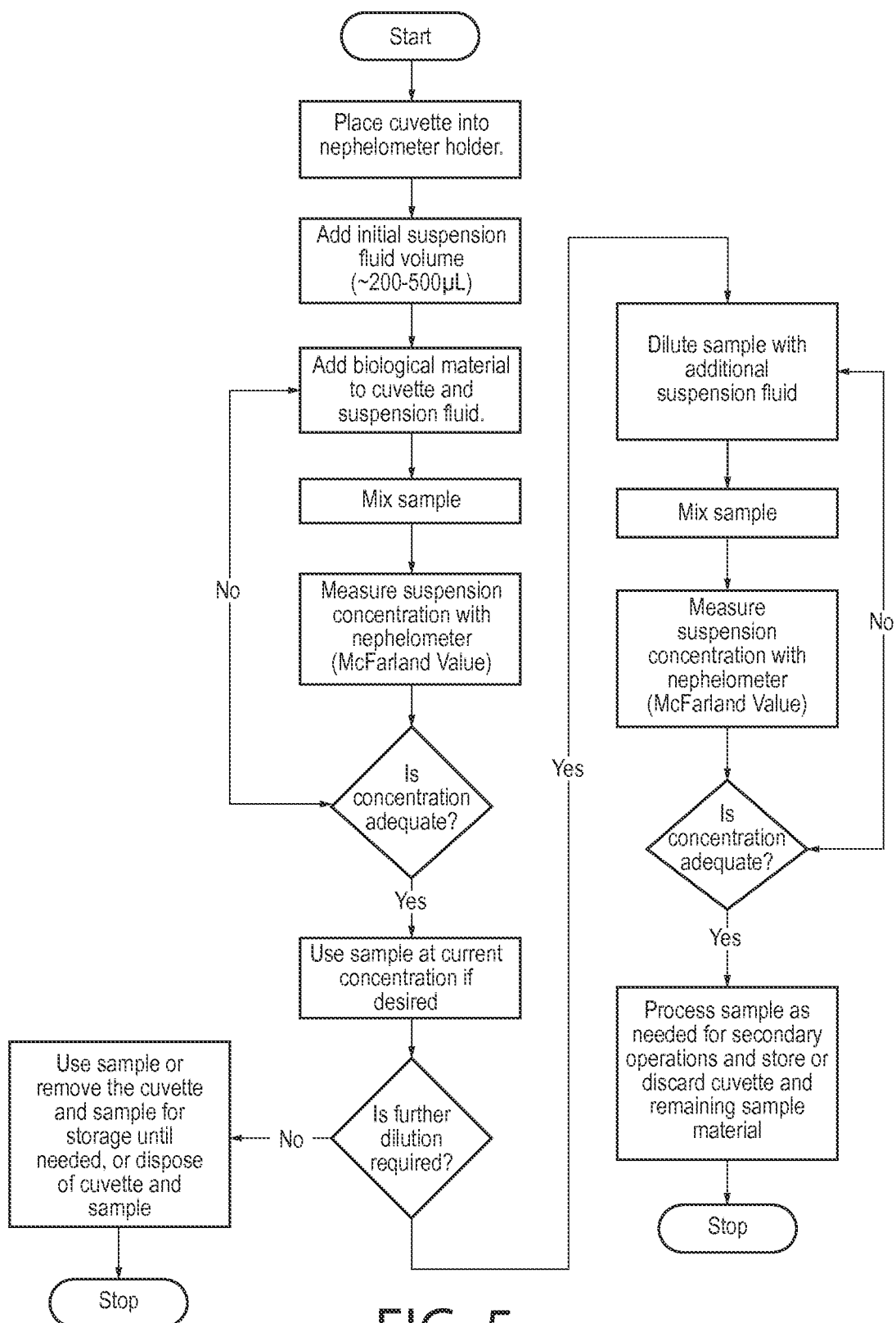
FIG. 5 is a process flow diagram illustrating one embodiment for a process to prepare a sample using the nephelometer described herein.

The cuvette/nephelometer assembly for measuring turbidity operated as described in the following embodiments. The cuvette 110 is placed inside the nephelometer base 100. The cuvettes are placed inside the nephelometer base either automatically or manually. Referring to FIG. 5, the initial suspension fluid (free of microorganisms) is placed inside the cuvette 100. The fluid volume is about 200 µL to about 500 µL. Preferably, the initial suspension fluid volume is about 300 µL. Additional fluid can be added to the cuvette if dilution is needed to obtain the specified McFarland values. Next, a biological sample suspected of containing microorganisms is added to the cuvette 110 and mixed with the suspension fluid to yield a test sample suspension. The apparatus described herein measures the initial turbidity of the test sample and the McFarland value is recorded. The sample suspension is further diluted by adding additional suspension fluid if the initial turbidity readings are too high. The dilution is automated in one embodiment. The upper portion allows the volume of the suspension fluid to exceed the volume of the lower portion. The apparatus measures the turbidity of the diluted suspension. Once the predetermined McFarland value is obtained, the suspension is either processed for downstream testing, stored or discarded. The suspension may be diluted as many times as necessary in order to obtain the desired McFarland values.

A light from source 130 interrogates the suspension 120 (e.g., tested sample) disposed inside the cuvette 110. The light that impinges on a surface (e.g., flat side wall of the cuvette/vessel) is referred to herein as the incident light. The light that is scattered from the particles of the suspension 120 is referred herein as the scattered light. A portion of the incident light is reflected by the cuvette surface. The refracted or transmitted light is the portion of the incident light that is transmitted through the surface (e.g., the flat side wall of the cuvette/vessel).

In operation, the transmitted light is received by the transmitted light detector 150. In the exemplary embodiments, the transmitted light detector 150 is positioned on the incident light path to maximize the detection of the light transmitted through the suspension. In instances where the surface of the detector 150 is highly reflective, the detector 150 may be positioned such that the detector surface is located at a slight angle (not 90 degrees) in relation to the light path axis. Positioning the detector 150 at an angle optimizes detection of the transmitted light without reflecting the light back into the suspension 120 or directing the light to other portions of the nephelometer. The intensity of light collected by the detector is proportional to the turbidity of the suspension.

A light attenuation filter 160 is positioned directly in front of the transmitted light detector 150. The filter reduces the intensity of the light incident on the detector by an amount that is proportional to that of the incident beam. In the exemplary embodiments, the filter allows the detector 150 to operate without saturating and provides sufficient detector operational intensity bandwidth to detect slight variations in the intensity of the transmitted light.

The apparatus according to the present invention also measures the amount of scattered light. The scatter detector 140 is placed with its detecting surface parallel to the incident light path and along one side of the cuvette. Portions of the light that are passed through the suspension sample are scattered by the particles in suspension. The side scatter detector 140 collects some of the scattered light. The amount of scattered light that the detector 140 collects provides a signal that is proportional to the amount of particles in the tested suspension 120. One way to measure the turbidity of the suspension 120 is to process the amount of scattered light collected by the scatter detector 140 through various algorithms well known in the art. The data collected from the scatter detector 140 may be combined with the data collected from the transmission detector 150 in various ways. For example, the signals can be physically combined or the detector values mathematically manipulated to combine them in a way to further enhance the accuracy and reliability of the initial signals. The signals or data values can be combined additively, subtractively, differentially, etc. to provide a resultant signal that is representative of the combined signals. When signals of detector values are combined in this manner it is possible to enhance the resolution and accuracy of collected data for measuring turbidity. Advantageously, data collected from two separate detectors (scatter and transmittance data) may provide more accurate results for small volume samples. The dual measurement is advantageous in those embodiments where a scatter measurement does not suffice. Although applicants do not wish to be held to a particular theory, in applicants' view the measurement of both transmitted and scattered light yields is more accurate because of the limited length of the light path through the small volume of sample.

In the exemplary embodiments, scatter detector 140 and transmittance detector 150 are standard high efficiency photo diode detectors. However, other detectors having similar characteristics may also be used. Suitable detectors include those that operate across the visible light spectrum from ultra-violet (UV) to infra-red (IR). Suitable detectors may be selected based on their linear response curves, size, reproducibility of results, and the ability to operate/detect light paths within low light conditions and detect minute variations in light intensity with measurable resolution. Examples include photo diodes, photo multiplier tubes, avalanche detectors, solar cells, photo resistors, photo sensors, etc. Such detectors are commercially available, well known to one skilled in the art and not described in detail herein.

In the exemplary embodiments, the light source is a high intensity light emitting diode (LED) or diode laser. Preferably, the frequency of the LED light is about 650 nm. Preferably the wavelength of the detector light is within the red color band (i.e. about 620 to 750 nm). However the skilled person might use interrogating light at different frequencies of visible light. Optionally, a focusing lens 170 (FIG. 1B) is used to focus the light into a narrow beam (e.g., a beam that is about 3 mm in diameter). The focusing lens 170 is positioned in front of the light source 130. The use of a focusing lens 170 concentrates the light from the light source 130 inside the sample area 410 of the vessel/cuvette and minimizes the amount of light that may be scattered from the test area. One skilled in the art is aware that a light which is scattered outside of the test area (i.e., the lower portion 410 of the cuvette) renders the scatter unusable for the purposes of measuring sample turbidity due to high background signal. The focused light then passes from the focusing lens 170 (not shown) into the lower portion 410 of the cuvette at an angle perpendicular to the face of the cuvette. The perpendicular angle mitigates unwanted diffraction and refraction which occurs when a beam of light passes from one medium (e.g., air) to another medium (e.g., flat surface sides of a cuvette). The path of the focused light beam is maintained as the light transmits through the suspension towards the detectors 140 and 150. In the embodiments where the light source is a diode laser, additional lenses may not be required to focus the light beam. This is due in part to the properties of the laser which provide collimated and focused light to interrogate the suspension. A focus lens or a series of apertures is used in the embodiments where the light source is an LED and collimating or focusing of the light is desired or required.

Figure 3:
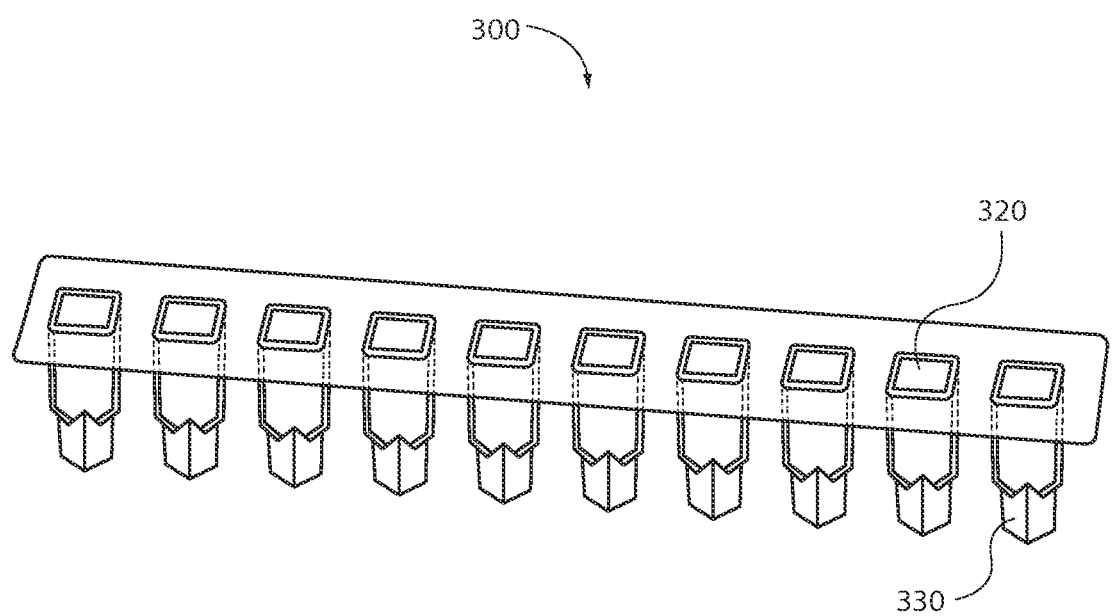
FIG. 3 illustrates a linear low volume multi-cuvette array/strip design for the continuous series cuvette nephelometer.

FIG. 3 illustrates the series cuvette array/receptacle for use with one embodiment of the apparatus of the present invention. The series cuvette array is a series cuvette strip that is moved along guided channel 220. An LED light source 130 is placed on one side of the guided channel 220 that guides the strip 300. The strip 300 is slideably engaged with the channels 220. The strip 300 also include stand-offs or other structures 530 (FIG. 6) for convenient stacking, packaging and shipping. The strip 300 is advanced through nephelometer and the cuvette wells 320 are positioned between the light source 130 and detectors 140 and 150 (not shown) for processing. After processing is complete the linear strip 300 may be indexed and advanced to the next cuvette and processing continued for the subsequent samples using the same nephelometer. The cuvette strip 300 may be stored or discarded based upon individual user's needs. In this embodiment, a single nephelometer is designed to efficiently process multiple samples without the need to remove individual cuvettes and replace them with new cuvettes. The linear cuvette strip 300 may be designed with various cuvette shapes, sizes and configurations. For example, the wells 320 of the strip 300 may be designed to be more or less deep, wider, narrower, longer, shorter etc. depending upon the cuvette design. In addition, the wells may be attached to one another across individual wells or be individually inserted into the wells positioned next to one another.

Figure 6:
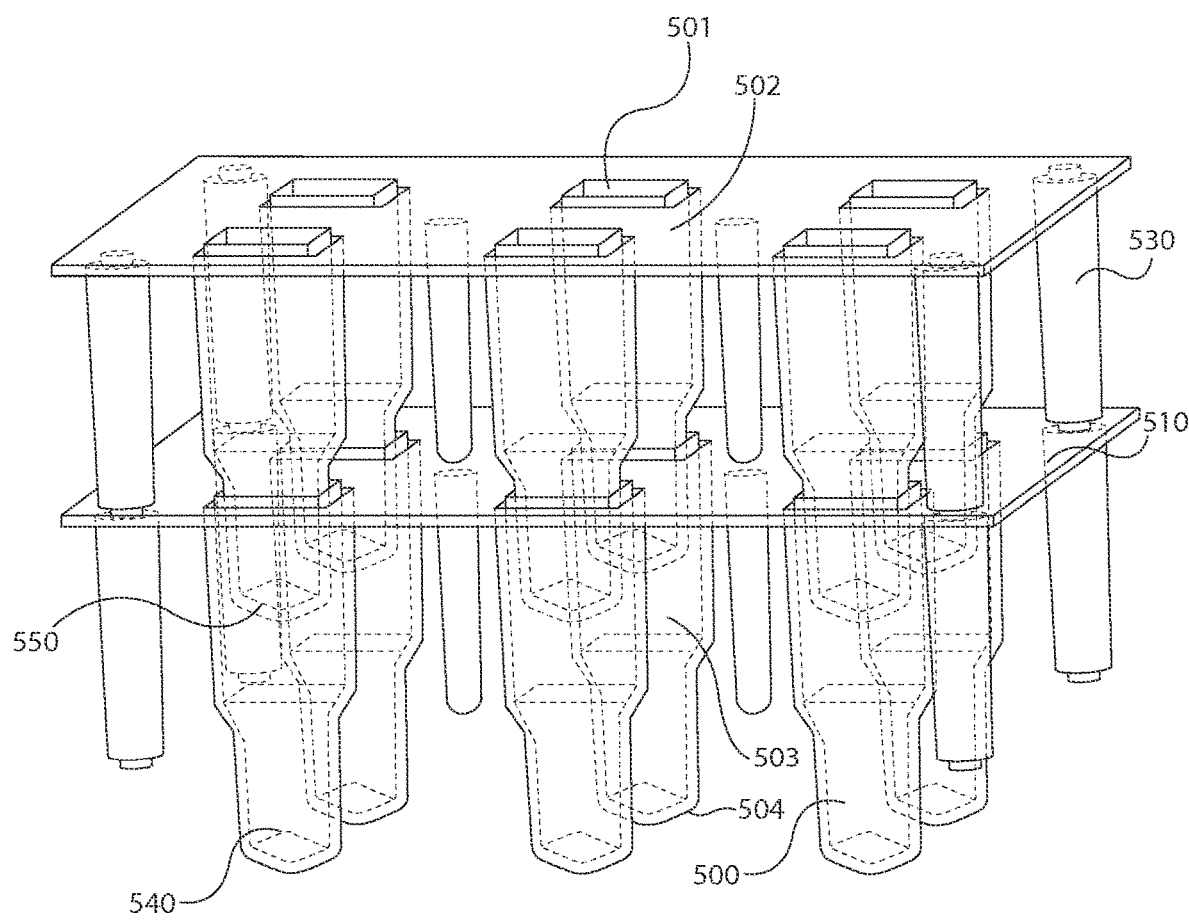
FIG. 6 illustrates stacked cuvettes.

In one embodiment, the cuvette strips are stackable and can be separated either into individual cuvettes or a linear strip of cuvettes, depending upon the nephelometer configuration. This embodiment is illustrated in FIG. 6. There cuvettes 500 are carried by rack 510. Rack 510 has a flat surface from which the cuvettes are suspended. The flat surface is scored (not shown) to allow the cuvettes to be separated into individual cuvettes or strips of cuvettes. The stackable cuvettes also have stand-offs 530 as described above. Note that, to facilitate stacking, the lower portion 540 of the cuvette 500 s received by the wider, upper portion 550.

Figure 2A:
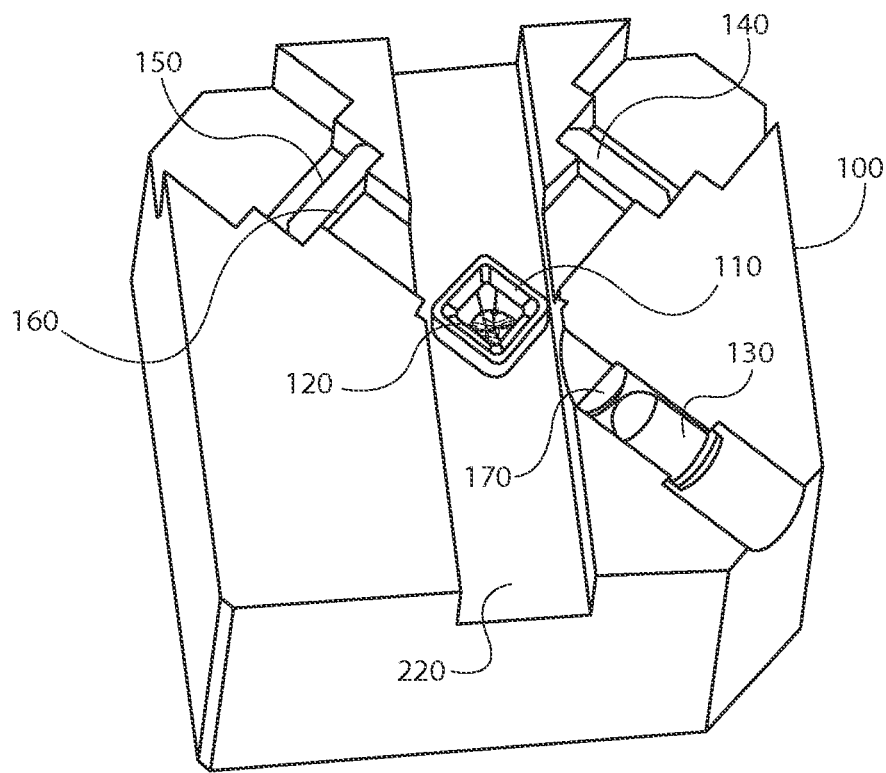
FIG. 2A is a series detail view of FIG. 1B.
Figure 2B:
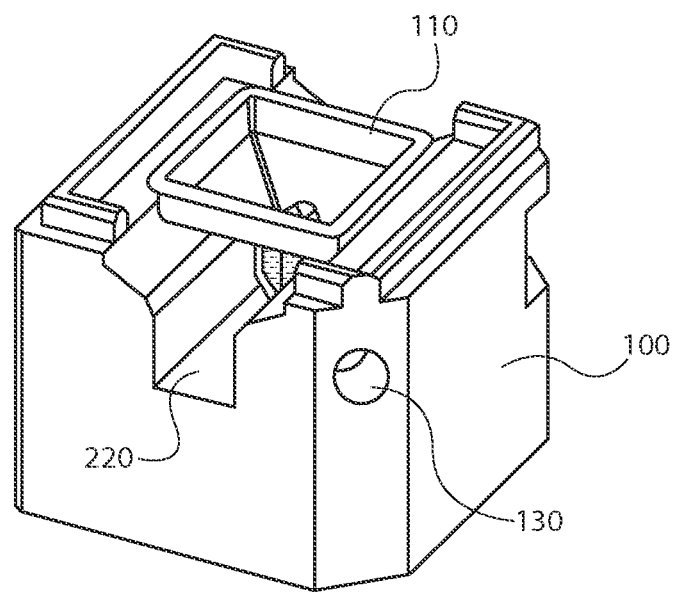
FIG. 2B is a perspective view of a continuous cuvette nephelometer.

FIG. 2 illustrates an embodiment where cuvettes are advanced through the nephelometer in series. The system is designed for use with a series of cuvettes that are advanced through the nephelometer in a continuous fashion. Individual cuvettes 110 may be placed directly inside a nephelometer base 100 by placing the lower portion of the cuvette into the channel 220 as shown in FIG. 2B. Alternatively, individual vessels 110 may be first placed inside the linear vessel array 300, and the linear array 300 (FIG. 3A.) housing multiple vessels can be placed inside the nephelometer via the pass through channel 220. After the vessels are placed inside the nephelometer base either individually or inside the linear array, the suspension is prepared in the cuvette and the turbidity measured as described above.

The system that houses a linear array of vessel (FIG. 2) also includes a light source 130, a focusing lens 170, a scatter detector 140, a transmitted light detector 150 and a light attenuation filter 160 (FIG. 1B as described above). The cuvette 110 with a sample 120 is positioned at the center of the apparatus and inside the nephelometer base 100. The light source 130, the scatter detector 140 and the transmitted light detector 150 are positioned at a 90 degree angle from one another around the cuvette 110 as described above. The side scatter detector surface 140 is positioned parallel to the incident beam from the light source 130. Positioning the scatter detector 140 within close proximity to the tested sample 120 and parallel to the incident light source minimizes the effects of diffraction, refraction and reflection on the scattered light. The transmitted light detector 150 is positioned opposite from the light source 130 and incident light from the light source propagates toward the transmitted light detector. The detector 150 also may be positioned either perpendicular to the incident light path or a few degrees from perpendicular to reduce reflection effects from its surfaces. The light attenuation filter 160 is positioned between the cuvette 110 and the transmitted light detector 150.

Figure 7:
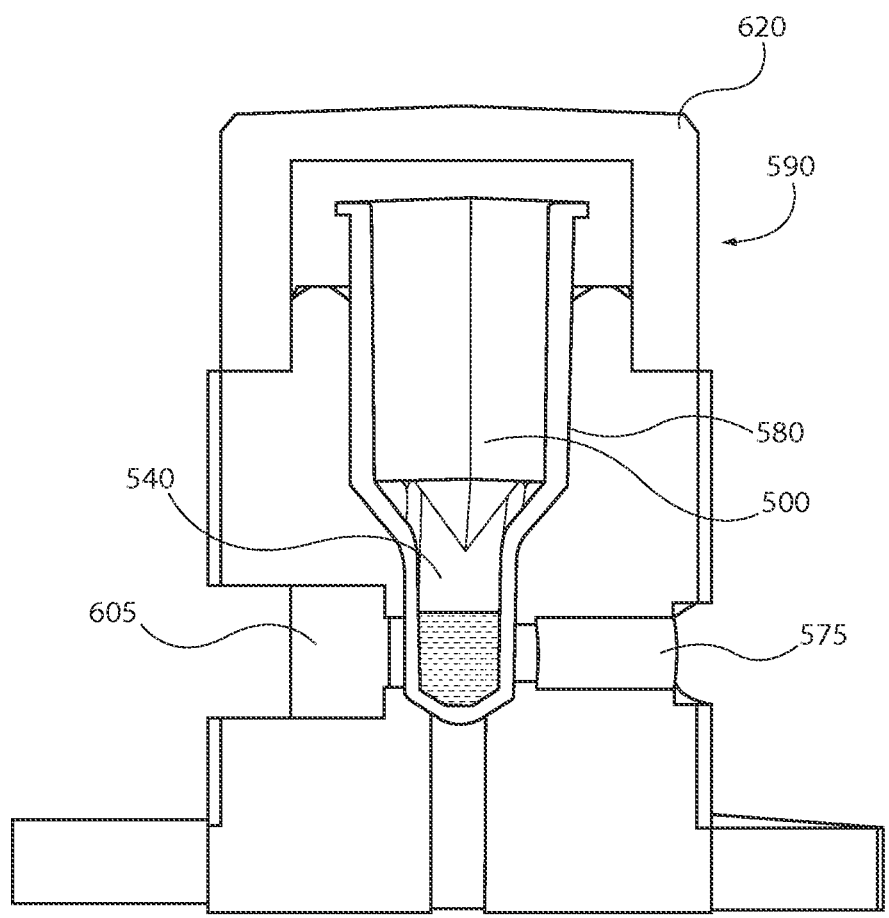
FIG. 7 is a cut away view of the transmitted light detector pathway for one embodiment of the present invention.

FIG. 7 is a cross section of a nephelometer showing the path for the light transmitted through the lower portion 540 of the cuvette 500. The light source (570, FIG. 9) is received by an aperture 575 on one side of cuvette receptacle 580 of the nephelometer 590. The aperture 575 receives the light source. The sensor 600 (FIG. 9) is positioned in an aperture 605 directly opposite the aperture 575, with the lower portion of the cuvette 540 positioned therebetween. The nephelometer has a lid 620.

Figure 8:
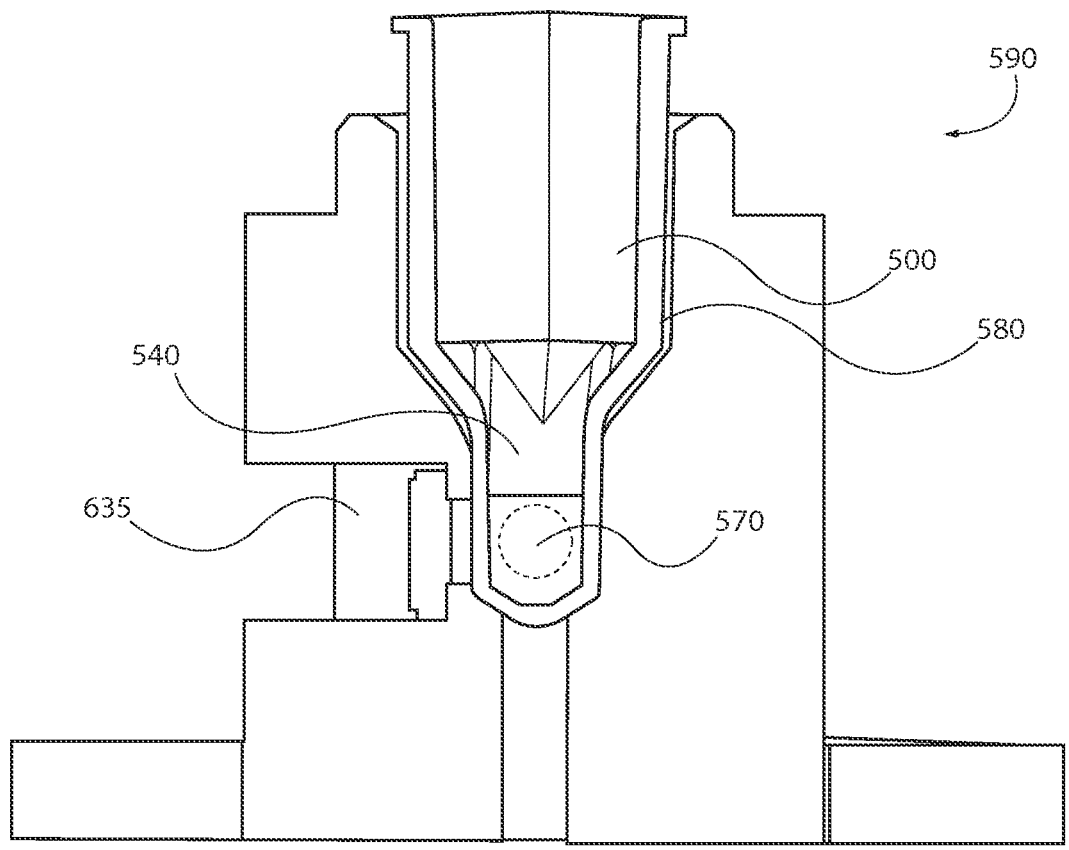
FIG. 8 is a cut away view of the scattered light detector pathway for one embodiment of the present invention.

FIG. 8 is a cross section of a nephelometer showing the path for the light scattered through the lower portion 540 of the cuvette 500. The light source (570, FIG. 9) is on one side of cuvette receptacle 580 of the nephelometer 590. The sensor 630 (FIG. 10) is positioned in an aperture 635 orthogonal to the light source 570, with the lower portion of the cuvette 540 positioned therebetween.

Figure 9:
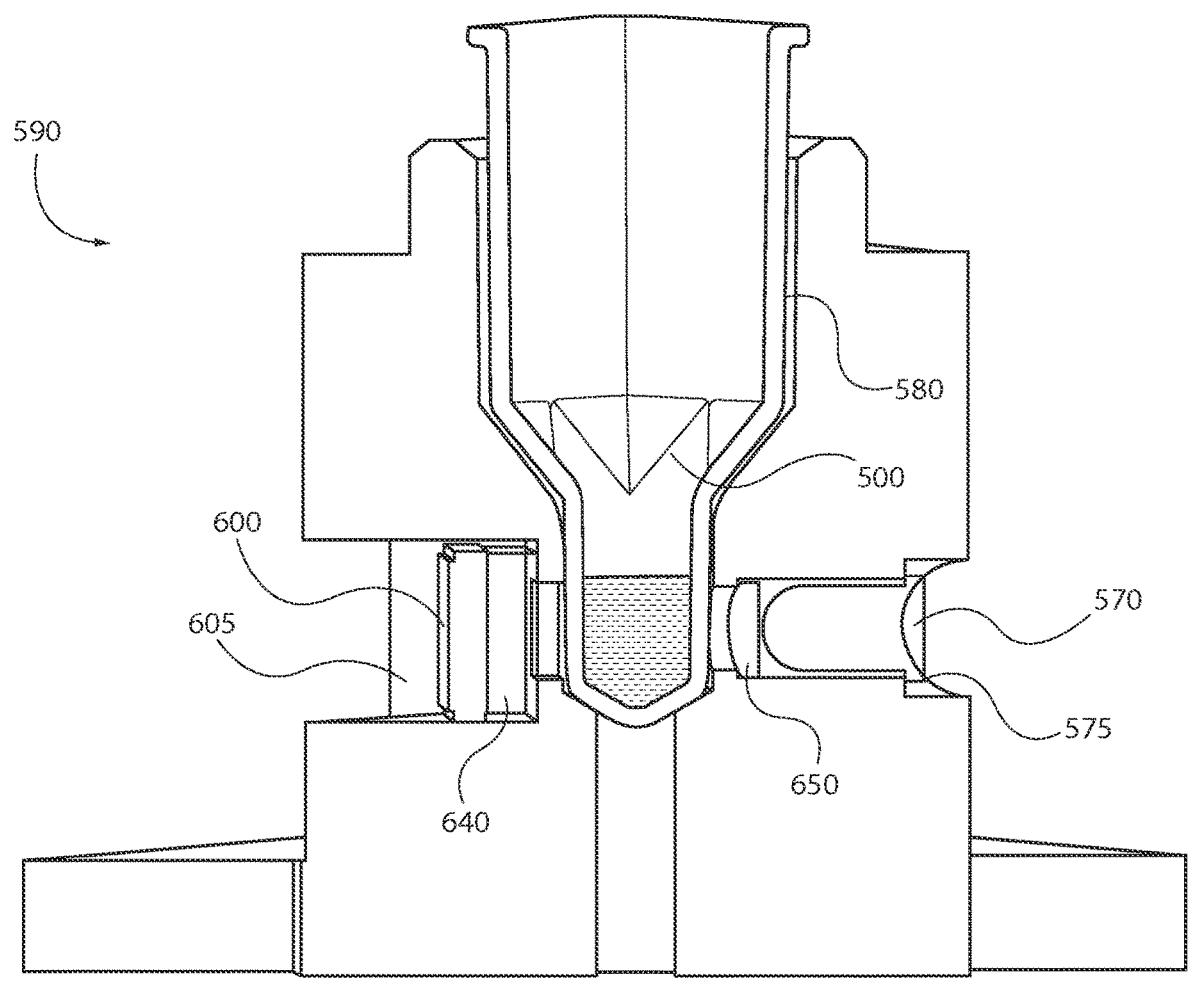
FIG. 9 is a cutaway view of the embodiment of FIG. 7 but illustrating the optical source and the transmitted light detector.

FIG. 9 is a cross section of a nephelometer showing the path for the light transmitted through the lower portion 540 of the cuvette 500. The light source 570 is received by an aperture 575 on one side of cuvette receptacle 580 of the nephelometer 590. Between the sensor 600 and cuvette 500 is a light attenuation filter 640 that is placed in front of the transmittance detector to decrease the light intensity to a usable level so as not to saturate sensor. The aperture 575 receives the light source 570 and the lens 650 for focusing the optical signal. The sensor 600 is positioned in an aperture 605 directly opposite the aperture 575, with the lower portion of the cuvette 540 positioned therebetween.

Figure 10:
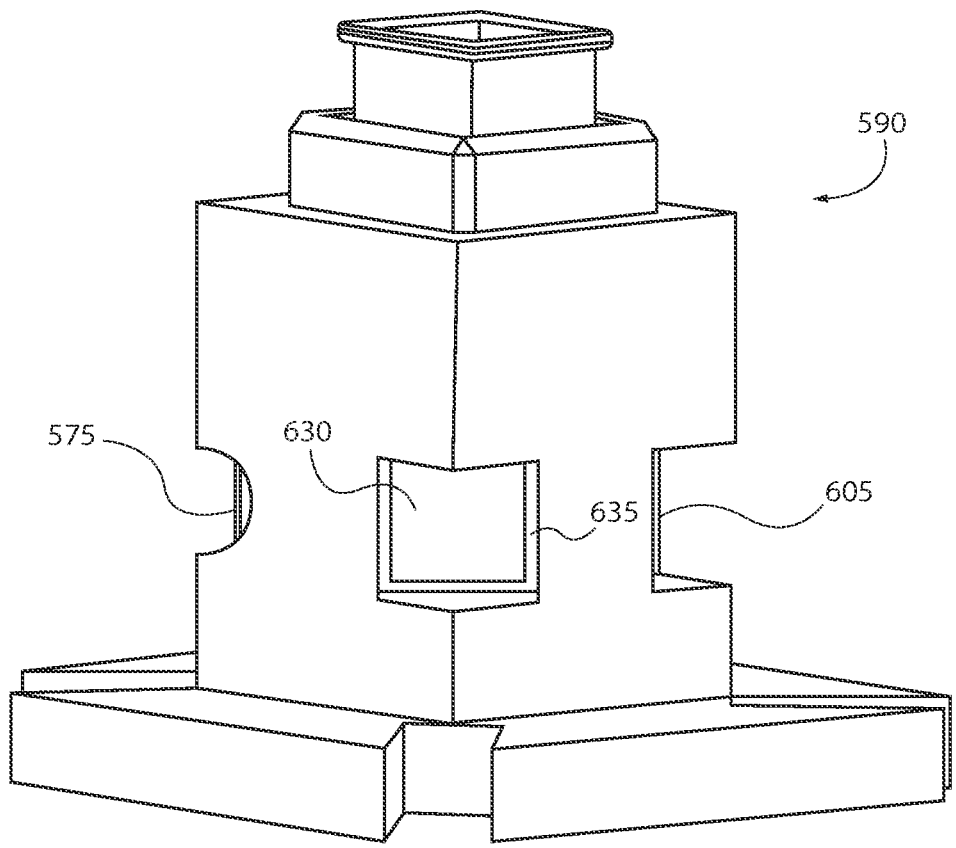
FIG. 10 is a perspective view of the nephelometer according to one embodiment.

FIG. 10 is perspective view of the nephelometer 590 showing aperture 575 for the optical source 570, aperture 635 for the scattered light sensor and aperture 605 for the transmitted light sensor.

In one embodiment, the sample is disposed inside a cuvette and individually processed when placed into the nephelometer. After the sample is processed and McFarland values are obtained, the cuvette is removed from the nephelometer and replaced by a new cuvette. In this embodiment, the one or more nephelometers are operated independently. In an alternative embodiment, the nephelometer is configured to deliver a continuous series of cuvettes to the nephelometer for measurement. A linear cuvette channel 220 receives a strip 300 of individual cuvette wells 320 (FIG. 3B). The strip is conveyed through the nephelometer, stopping for each cuvette to be optically interrogated for measurement as described in detail elsewhere herein.

The methods of measuring the turbidity according to the present invention are automated. The data collected from the measurements may be further processed to generate meaningful results. In these embodiments, the signal from the detectors are fed to signal amplifiers. The amplifier output is communicated to an analog to digital converter circuit that outputs a digital representation of the input signal that is then processed using various algorithms to determine if the measured value is at the target value. If the measured value is higher than the target value, then the sample is diluted as described above, and the turbidity re-measured. Such re-measurement can be done manually by an operator or in an automated manner where the cuvette is transferred out of the nephelometer for dilution and transported back to the nephelometer for an additional measurement. The methods for processing the signal into a usable output are developed using varying dilutions of various biological and non-biological sample and associating McFarland values with the suspension concentrations. These data are then used to produce data sets that are further analyzed using algorithms that correct the linearity and offsets of the data curves to produce a representative output value for a turbidity value and compared with the target value. This process is repeated until the target turbidity is obtained.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus for optical interrogation of a sample comprising:
   an optical source for an optical signal;
   a base having a cuvette receptacle therein, wherein the cuvette receptacle comprises a channel that is adapted to receive a linear array of cuvettes, each cuvette in the linear array comprising a narrower, lower portion comprising a plurality of planar side walls, each side wall at an angle from an adjacent sidewall and a wider, upper portion comprising a plurality of side walls, each side wall at an angle from an adjacent sidewall, the wider, upper portion having a perimeter larger than a perimeter of the narrower, lower portion, the cuvette further comprising a transition region from the wider, upper portion to the narrower, lower portion, wherein the channel is adapted to support the transition region of the cuvette and conform thereto as the narrower, lower portion is suspended in the channel the base adapted to position the cuvette such that the optical source positioned in a first aperture in the base that is configured to define a single optical path for transmitting an optical signal from the optical source directly through the planar side wall of the narrower, lower portion of the cuvette;

a scattered light detector positioned in a second aperture in the base to receive the optical signal from the optical source scattered by contents in the narrower, lower portion of the cuvette, the scattered light detector having a surface positioned approximately parallel to an optical path from the optical source; and wherein the optical source and scattered light detector are at least partially disposed in apertures in the apparatus, and wherein the base has a single optical source.

2. The apparatus of claim 1 further comprising:
a channel configured to advance a linear series of cuvettes, each cuvette being advanced in series to a measurement position, wherein the lower portion of the cuvette is adjacent to the optical source and scattered light detector for measurement.

3. The apparatus of claim 2, wherein the apparatus is a nephelometer.

4. The apparatus of claim 1 further comprising a transmitted light detector positioned in a third aperture in the base and a light attenuation filter positioned between the cuvette and the transmitted light detector.

5. The apparatus of claim 4, wherein the scattered light detector and the transmitted light detector are positioned at a 90 degree angle from each other.

6. The apparatus of claim 4, wherein the scattered light and transmitted light detectors operate across a visible light spectrum from ultra-violet (UV) to infra-red (IR).

7. The apparatus of claim 6, wherein a wavelength of detected light is in a range of about 620 to about 750 nm.

8. The apparatus of claim 1, wherein the optical source is selected from the group consisting of a laser light source and an LED.

9. The apparatus of claim 1, wherein the first aperture comprises of a focusing lens or a series of apertures positioned intermediate between the optical source and the narrower, lower portion of the cuvette.

10. The apparatus of claim 9, wherein the focusing lens, aperture or series of apertures collimates light transmitted therethrough.

11. The apparatus of claim 1, wherein the cuvette is optically transparent.

12. An apparatus for optical interrogation of a sample comprising:
a base;
a channel in the base;
a single optical source for an optical signal positioned in a first aperture in the base such that the base defines a single optical path from the single optical source; and
a first detector positioned in a second aperture in the base to receive the optical signal scattered by a sample disposed in a cuvette in a linear array of cuvettes received by the apparatus, wherein the channel is adapted to receive the linear array of cuvettes, wherein both the channel and each cuvette in the linear array of cuvettes has a narrower, lower portion and a wider, upper portion, the wider, upper portion having a perimeter larger than the perimeter of the narrower, lower portion, and wherein the narrower, lower portion of the cuvettes and the wider, upper portion of the cuvettes each comprises a plurality of planar side walls, each side wall at an angle from an adjacent sidewall, the cuvette further comprising a tapered portion from the wider, upper portion to the lower, narrower portion, wherein the channel is adapted to receive the tapered portion and conform thereto, the apparatus further adapted to position a cuvette in the array of cuvettes so that the lower, narrower portion of the cuvette is suspended in the single optical path from the single optical source such that the first detector detects the optical signal transmitted from the first aperture and scattered by the sample only in the narrower, lower portion of the cuvette; and wherein the single optical source and first detector are at least partially disposed in apertures in the base, and wherein the linear array of cuvettes is advances through the channel.

13. The apparatus of claim 12, wherein the apparatus is a spectrometer.

14. The apparatus of claim 12, wherein the apparatus is a nephelometer further comprising a second detector positioned in a third aperture in the base to receive the optical signal from the optical source transmitted from the first aperture through sample in the narrower, lower portion of the cuvette, the second detector having a surface positioned approximately parallel to an optical path from the optical source to the first detector.

15. The apparatus of claim 14, wherein the detectors operate across a visible light spectrum from ultra-violet (UV) to infra-red (IR).

16. The apparatus of claim 15, wherein a wavelength of detected light is in a range of about 620 to about 750 nm.

17. The apparatus of claim 14 further comprising a light attenuation filter positioned between the cuvette and the first detector.

18. The apparatus of claim 14, wherein the first aperture comprises one of a focusing lens, an aperture or a series of apertures positioned intermediate between the single optical source and the narrower, lower portion of the cuvette.

19. The apparatus of claim 18, wherein light transmitted to the cuvette is collimated.

20. The apparatus of claim 14, wherein the optical source is selected from the group consisting of a laser light source and an LED.

21. The apparatus of claim 14, wherein the first and second detectors are positioned at a 90 degree angle from each other.

22. The apparatus of claim 14, wherein the cuvette is optically transparent.

23. A method for measuring a turbidity of a sample comprising:
separating at least one linear array of cuvettes from a stack of linear arrays of cuvettes;
providing the separated linear array of cuvettes to a nephelometric apparatus each cuvette in the linear array of cuvettes comprising a narrower, lower portion and a wider, upper portion the wider, upper portion having a perimeter larger than the perimeter of the narrower, lower portion such that the narrower, lower portion of a first cuvette will fit within the wider, upper portion of a second cuvette thereby permitting the first cuvette to be stacked onto the second cuvette, wherein the narrower lower portion and the wider upper portion each comprises a plurality of planar side walls, each side wall at an angle from an adjacent sidewall, the cuvette further comprising a tapered portion from the wider, upper portion to the narrower, lower portion the cuvette having a sample for inspection disposed in at least the narrower, lower portion;
receiving the cuvette in a channel in a base, wherein the channel has a tapered portion and the channel conforms to the tapered portion and positions the cuvette such that a planar sidewall of the narrower, lower portion of the cuvette is positioned in an optical path defined by an aperture or series of apertures from a light source that emits light directed only into the narrower, lower portion of the cuvette through the aperture or the series of apertures;

transmitting light from the light source through the aperture or the series of apertures along the optical path, wherein the optical path is a single optical path further defined by the base and through a planar sidewall of the narrower, lower portion of the cuvette and into the narrower, lower portion of the cuvette;

detecting, using a scattered signal detector, an optical signal from the optical source scattered by contents in the lower portion of the cuvette, the scattered signal detector having a surface positioned in an aperture orthogonal to the aperture in which the light source is placed, wherein the detector surface is approximately parallel to the optical path from the optical source; and advancing the linear array of cuvettes to position another cuvette in the array of cuvettes in the optical path and detecting, using the scattered signal detector, the optical signal from the optical source scattered by contents in the narrower, lower portion of the another cuvette in the array of cuvettes, the scattered signal detector having a surface positioned in an aperture orthogonal to the aperture in which the light source is placed, wherein the detector surface is approximately parallel to the optical path from the optical source.

24. The method of claim 23, wherein the array is placed in the nephelometric apparatus such that the turbidity of sample disposed in each cuvette is measured.

25. The method of claim 23 further comprising collimating light directed to the lower narrower portion of the cuvette.

* * * * *